(12) United States Patent
Nagata

(10) Patent No.: US 10,942,131 B2
(45) Date of Patent: Mar. 9, 2021

(54) INSPECTION APPARATUS AND INSPECTION METHOD

(71) Applicant: SCREEN HOLDINGS CO., LTD., Kyoto (JP)

(72) Inventor: Yasushi Nagata, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/320,955

(22) PCT Filed: Jun. 16, 2017

(86) PCT No.: PCT/JP2017/022333
§ 371 (c)(1),
(2) Date: Jan. 25, 2019

(87) PCT Pub. No.: WO2018/034051
PCT Pub. Date: Feb. 22, 2018

(65) Prior Publication Data
US 2019/0178811 A1 Jun. 13, 2019

(30) Foreign Application Priority Data

Aug. 18, 2016 (JP) .............................. JP2016-160429

(51) Int. Cl.
*G01N 21/88* (2006.01)
*G01B 11/30* (2006.01)

(52) U.S. Cl.
CPC ......... *G01N 21/8851* (2013.01); *G01B 11/30* (2013.01); *G01N 21/88* (2013.01)

(58) Field of Classification Search
CPC ..... G01B 11/30; G01N 21/88; G01N 21/8851
(Continued)

(56) References Cited

U.S. PATENT DOCUMENTS 6,005,965 A * 12/1999 Tsuda ............... G01N 21/95684
250/559.08
6,075,883 A 6/2000 Stern et al.
(Continued)

FOREIGN PATENT DOCUMENTS

JP H04-143639 A 5/1992
JP 05-000441 U 1/1993
(Continued)

OTHER PUBLICATIONS

Notification Concerning Transmittal of International Preliminary Report on Patentability, dated Feb. 28, 2019, issued in corresponding International Application No. PCT/JP2017/022333, including English translation.
(Continued)

*Primary Examiner* — Tri T Ton
(74) *Attorney, Agent, or Firm* — McDermott Will & Emery LLP

(57) ABSTRACT

A first imaging unit images a first region to be subjected to mirror finish treatment of an inspection region of a surface of the object. A second imaging unit images a second region not to be subjected to the mirror finish treatment of the inspection region of the surface of the object. An inspection unit inspects a form of the first region based on a first picked-up image taken by the first imaging unit, and a form of the second region based on a second picked-up image taken by the second imaging unit. During imaging, a holder holds the object so as to have a positional relationship in which the first region has a normal along a first direction rather than a second direction.

13 Claims, 5 Drawing Sheets

(58) Field of Classification Search
USPC .............. 356/237.1–237.6, 239.1–239.8
See application file for complete search history.

(56) References Cited

U.S. PATENT DOCUMENTS

| | | | |
|---|---|---|---|
| 2006/0030059 A1 | 2/2006 | Noguchi et al. | |
| 2007/0146697 A1* | 6/2007 | Noguchi | B82Y 15/00 356/237.5 |
| 2009/0091768 A1* | 4/2009 | Itoh | G01M 11/00 356/611 |
| 2017/0219495 A1 | 8/2017 | Nagata et al. | |
| 2017/0307544 A1 | 10/2017 | Nagata | |

FOREIGN PATENT DOCUMENTS

| | | |
|---|---|---|
| JP | 05-280950 A | 10/1993 |
| JP | 10-227623 A | 8/1998 |
| JP | 2000-310598 A | 11/2000 |
| JP | 2005-017234 A | 10/2005 |
| JP | 2007-069405 A | 3/2007 |
| JP | 2009-162573 A | 7/2009 |
| JP | 2015-068668 A | 4/2015 |
| JP | 2016-057075 A | 4/2016 |
| JP | 2016-070732 A | 5/2016 |
| WO | 2016/035381 A1 | 3/2016 |
| WO | 2016/051841 A1 | 4/2016 |

OTHER PUBLICATIONS

International Search Report issued in corresponding International Patent Application No. PCT/JP2017/022333, dated Sep. 5, 2017, with English Translation.
Extended European Search Report issued in corresponding European Patent Application No. 17841279.7-1230, dated Mar. 13, 2020.
Korean Notification of Reason for Refusal issued in corresponding Korean Patent Application No. 10-2019-7002519, dated Mar. 20, 2020, with English translation.
Japanese Notice of Reasons for Refusal issued in corresponding Japanese Patent Application No. 2016-160429, dated Jun. 30, 2020, with English translation.
Korean Notice of Final Rejection issued in corresponding Korean Patent Application No. 10-2019-7002519, dated Oct. 28, 2020, with English translation.
Chinese Office Action issued in corresponding Chinese Patent Application No. 201780047298.3, dated Oct. 16, 2020, with Engish translation.
European Office Action issued in corresponding European Patent Application No. 17841279.7-1230, dated Oct. 26, 2020.

* cited by examiner

INSPECTION APPARATUS AND INSPECTION METHOD

CROSS REFERENCE TO RELATED APPLICATIONS

This application is the U.S. National Phase under 35 US.C. § 371 of International Application No. PCT/JP2017/022333, filed on Jun. 16, 2017, which claims the benefit of Japanese Application No. 2016-160429, filed on Aug. 18, 2016, the entire contents of each are hereby incorporated by reference.

TECHNICAL FIELD

The present invention relates to a technique for inspecting a surface form of an object.

BACKGROUND ART

Conventionally, there has been known a technique for imaging some regions of a surface of an object to inspect a form of the surface.

For example, Patent Document 1 discloses a technique for imaging an object provided in its entire surface with a large number of minute irregularities (hereinafter, this kind of state is referred to as a satin finished surface) multiple times while irradiating the object with light under different irradiation conditions to inspect a form of the surface.

PRIOR ART DOCUMENT

Patent Document

Patent Document 1: Japanese Patent Application Laid-Open No. 2015-68668

SUMMARY

Problem to be Solved by the Invention

Unfortunately, the entire surface of the object is not necessarily in a uniform state. For example, metal components formed by forging or casting (e.g., automobile components) may each have a surface including a mirror surface region and a satin finished surface region. Reflection of light varies depending on a surface state, so that a technique for inspecting a form of this kind of surface, with high accuracy, has room for improvement.

The present invention is made in light of the above-mentioned problem, and an object thereof is to provide a technique for inspecting a surface form of an object, with high accuracy.

Means to Solve the Problem

To solve the above problem, an inspection apparatus according to a first aspect includes the following: a holder holing an object whose surface includes an inspection region including a first region to be subjected to mirror finish treatment and a second region not to be subjected to the mirror finish treatment; a first imaging unit imaging the inspection region from a first direction while the inspection region is irradiated with light from the first direction when viewed from the object held by the holder; a second imaging unit imaging the inspection region from a second direction while the inspection region is irradiated with light from the second direction when viewed from the object held by the holder; and an inspection unit inspecting a form of the first region based on a first picked-up image taken by the first imaging unit, as well as a form of the second region based on a second picked-up image taken by the second imaging unit, wherein the holder holds the object so as to have a positional relationship in which the first region has a normal along the first direction rather than the second direction.

The inspection apparatus according to the first aspect includes an inspection apparatus according to a second aspect that further includes a storage storing a first reference image corresponding to the first picked-up image having no anomaly in the form of the first region, as well as a second reference image corresponding to the second picked-up image having no anomaly in the form of the second region, wherein the inspection unit inspects the form of the first region by comparing the first picked-up image with the first reference image, and the form of the second region by comparing the second picked-up image with the second reference image.

The inspection apparatus according to the second aspect includes an inspection apparatus according to a third aspect in which the inspection unit inspects the form of the first region by comparing the first picked-up image with the first reference image for only the first region.

The inspection apparatus according to the second or third aspect includes an inspection apparatus according to a fourth aspect in which the inspection unit inspects the form of the second region by comparing the second picked-up image with the second reference image for only the second region.

The inspection apparatus according to any one of the first to fourth aspects includes an inspection apparatus according to a fifth aspect that further includes a rotating unit that rotates the object held by the holder around a rotation axis while maintaining the positional relationship.

The inspection apparatus according to the fifth aspect includes an inspection apparatus according to a sixth aspect in which the first imaging unit images the inspection region for each of rotation angles to take a plurality of the first picked-up images, and the inspection unit inspects the form of the first region based on an image having a maximum luminance evaluation value in the first region of the plurality of the first picked-up images.

The inspection apparatus according to the fifth or sixth aspect includes an inspection apparatus according to a seventh aspect in which the second imaging unit images the inspection region for each of the rotation angles to take a plurality of the second picked-up images, and the inspection unit inspects the form of the second region based on the plurality of the second picked-up images.

The inspection apparatus according to any one of the first to seventh aspects includes an inspection apparatus according to an eighth aspect in which the first imaging unit has a plurality of first cameras disposed around a central axis, and a plurality of first lighting apparatuses irradiating the inspection region with light from a side of the plurality of first cameras, and the first imaging unit takes a plurality of the first picked-up images by imaging the inspection region, irradiated with light from the corresponding one of the first lighting apparatuses, with the corresponding one of the first cameras, and in which the inspection unit inspects the form of the first region based on an image having a maximum luminance evaluation value in the inspection region of the plurality of the first picked-up images.

The inspection apparatus according to any one of the first to eighth aspects includes an inspection apparatus according to a ninth aspect in which the second imaging unit has a plurality of second cameras disposed around a central axis, and a plurality of second lighting apparatuses irradiating the inspection region with light from a side of the plurality of second cameras, and the second imaging unit takes a plurality of the second picked-up images by imaging the inspection region, irradiated with light from the corresponding one of the second lighting apparatuses, with the corresponding one of the second cameras, and in which the inspection unit inspects the form of the second region based on the plurality of the second picked-up images.

An inspection method according to tenth aspect includes: a holding step of holding an object whose surface includes an inspection region including a first region to be subjected to mirror finish treatment and a second region not to be subjected to the mirror finish treatment; a first imaging step of imaging the inspection region from a first direction while the inspection region is irradiated with light from the first direction when viewed from the object held in the holding step; a second imaging step of imaging the inspection region from a second direction while the inspection region is irradiated with light from the second direction when viewed from the object held in the holding step; and an inspecting step of inspecting a form of the first region based on a first picked-up image taken in the first imaging step, as well as a form of the second region based on a second picked-up image taken in the second imaging step, wherein in the holding step, the object is held so as to have a positional relationship in which the first region has a normal along the first direction rather than the second direction.

Effects of the Invention

The inspection apparatuses according the first to ninth aspects and the inspection method according to the tenth aspect enable a surface form of an object to be inspected with high accuracy.

DESCRIPTION OF EMBODIMENTS

Figure 1:
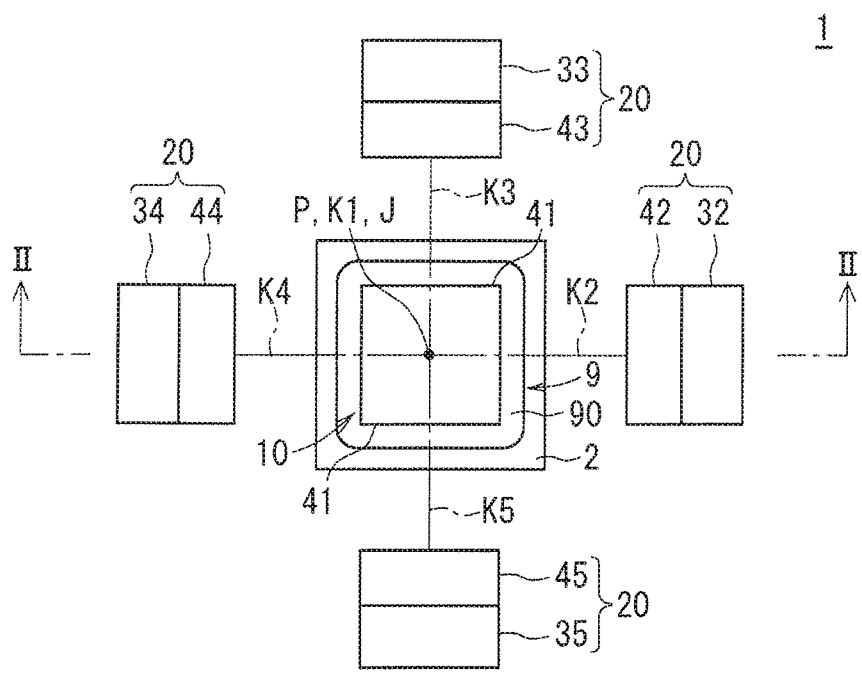
FIG. 1 is a top view illustrating a state in which an inspection apparatus 1 inspects an object 9.

Hereinafter, embodiments will be described with reference to the drawings. In each of the drawings, the same reference numeral is assigned to a part having a similar configuration and function, and duplicated description is eliminated. Each of the drawings is illustrated schematically.

1 Embodiment

<1.1 Configuration of Inspection Apparatus 1>

Figure 2:
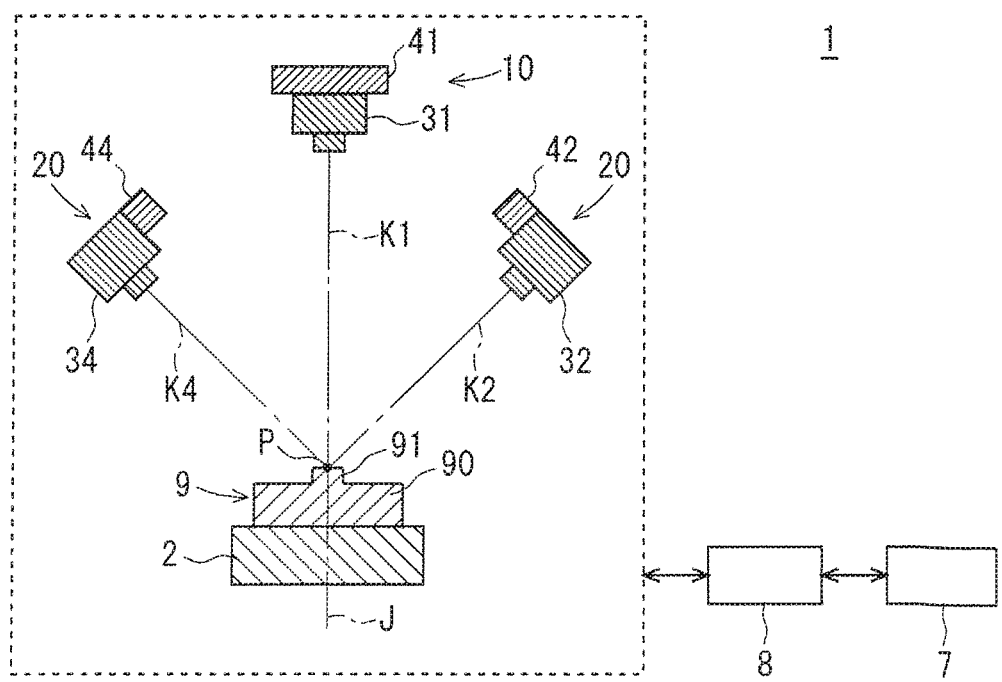
FIG. 2 is an end view of the inspection apparatus 1 seen from end face II-II of FIG. 1.

FIG. 1 is a top view illustrating a state in which an inspection apparatus 1 inspects an object 9. FIG. 2 is an end view of the inspection apparatus 1 seen from end face II-II of FIG. 1.

The inspection apparatus 1 includes a holder 2 that holds the object 9, a first imaging unit 10 that images a surface of the object 9 held by the holder 2 vertically from above, a second imaging unit 20 that images the surface of the object 9 held by the holder 2 obliquely from above (more specifically, a direction inclined upward at 45 degrees from the horizontal plane), and a controller 8 that controls each unit of the inspection apparatus 1.

The object 9 is a metal component obtained by forming a rough shape by casting and then subjecting it to surface finishing treatment. Hereinafter, an example of manufacturing processes of the object 9 will be described. During casting, there are formed a body portion similar in shape to an end product, and a protruding portion unnecessary for the end product, as a portion for releasing, from the body portion, bubbles generated in a cast metal in the course of forming a rough shape. Next, satin treatment is performed on the entire surface of the cast metal. This kind of satin treatment includes a shot blasting treatment in which a steel ball collides with a surface of the cast metal to form minute irregularities on the surface, for example. After the satin treatment, there are performed removal treatment for removing a portion having a nest of bubbles inside the protruding portion, and mirror finish treatment for finishing the removed portion to a mirror surface. This kind of removal treatment and mirror finish treatment include grinder treatment for scraping off a portion having the nest by grinding, for example.

As a result of this kind of manufacturing, the object 9 has a base portion 90 in a quadrangular prismatic shape (structure corresponding to the body portion) having rounded corners, and a protrusion 91 (structure in which a portion having the nest is removed from the protruding portion) protruding in a cylindrical shape from the center of the base portion 90.

The holder 2 is a flat table with a flat upper surface, and supports the object 9 placed on the upper surface from below. As illustrated in FIG. 2, the object 9 is placed on the upper surface of the holder 2 with the protrusion 91 facing upward.

The first imaging unit 10 includes a first lighting apparatus 41 that irradiates the surface of the object 9 held by the holder 2 with light from a first direction (vertically from above in the present embodiment), and a first camera 31 that images the surface of the object 9 from the first direction. Here, a region to be irradiated with light and imaged is specifically a region including a part of the upper surface of the base portion 90 and the entire protrusion 91 of the entire surface of the object 9. Hereinafter, this region is called an inspection region.

Figure 3:
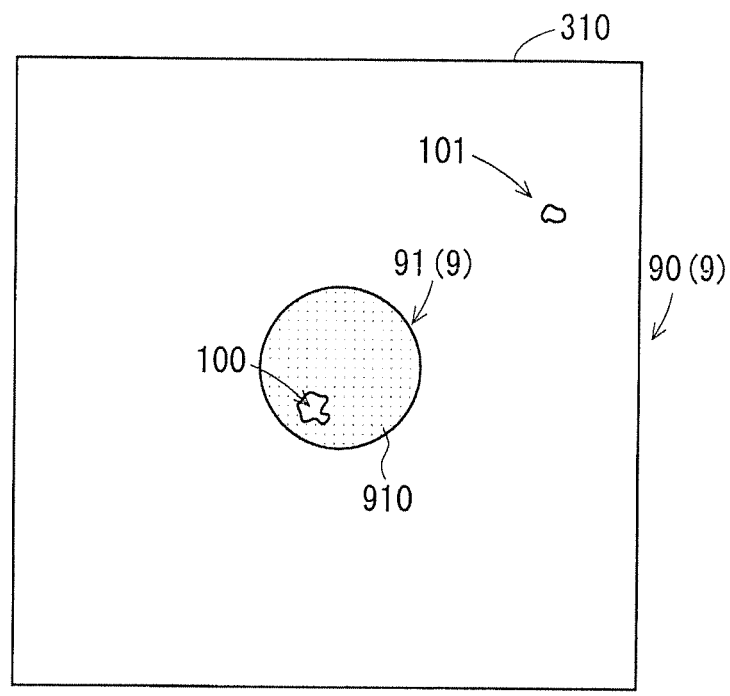
FIG. 3 shows an example of a first picked-up image 310.

When the controller 8 causes illumination by the first lighting apparatus 41 and imaging by the first camera 31 to be simultaneously performed, the inspection region of the object 9 is imaged from the first direction while being irradiated with light from the first direction. FIG. 3 shows an example of a first picked-up image 310 taken by this imaging. FIG. 3 includes a shaded portion where mirror finish treatment has been actually performed.

The second imaging unit 20 includes four second lighting apparatuses 42 to 45 for irradiating the inspection region of the object 9 with light from four second directions (in the present embodiment, a direction inclined upward at 45 degrees from the horizontal plane) as viewed from the object 9 held by the holder 2, and four second cameras 32 to 35 for imaging the inspection region of the object 9 from the respective four second directions. The first camera 31 as well as each of the second cameras 32 to 35 are composed of digital cameras having a charge coupled device (CCD), a complementary metal-oxide semiconductor (CMOS), or the like, for example. The first lighting apparatus 41 as well as each of the second lighting apparatuses 42 to 45 are composed of light emitting diode (LED) light sources, for example.

Each of the second cameras 32 to 35 is disposed at equal intervals (more specifically, at intervals of 90 degrees in horizontal view) around a center axis J along the vertical direction. In addition, each of the second lighting apparatuses 42 to 45 is provided integrally with the corresponding one of the second cameras 32 to 35 so as to emit light toward the inspection region from near the corresponding one of the second cameras 32 to 35.

Figure 4:
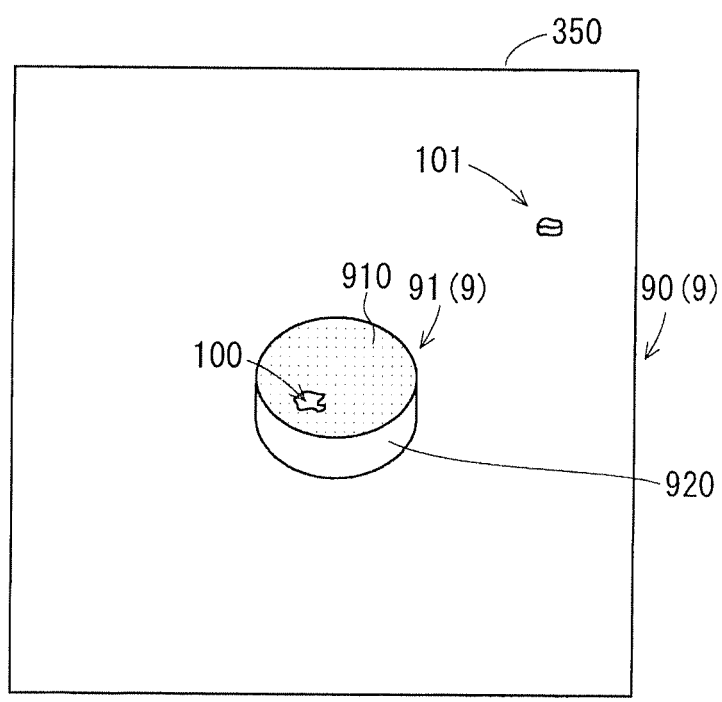
FIG. 4 shows an example of a second picked-up image 350.

When the controller 8 causes illumination by the second lighting apparatuses 42 to 45 and imaging by the corresponding second cameras 32 to 35 to be simultaneously performed, the inspection region of the object 9 is imaged from the respective second directions while being irradiated with light from the respective second directions. FIG. 4 shows an example of a second picked-up image 350 taken by operation of the second lighting apparatus 45 and the second camera 35 of four second picked-up images taken by this imaging. FIG. 4 includes a shaded portion where mirror finish treatment has been actually performed.

As described above, the object 9 is placed on the upper surface of the holder 2 with the protrusion 91 facing upward. Accordingly, a region (a circular region in horizontal view) corresponding to the upper surface of the protrusion 91 of the entire surface of the object 9 serves as a first region 910 to be subjected to mirror finish treatment, and a region obtained by excluding the first region 910 from the entire surface of the object 9 serves as a second region 920 not to be subjected to the mirror finish treatment.

Unfortunately, in the course of manufacturing the object 9, a bubble nest 100 may be unintentionally generated in the first region 910 to cause a region corresponding to the nest 100 of the first region 910 not to be subjected to the mirror finish treatment (e.g., grinder treatment). In addition, in the course of manufacturing the object 9, burrs 101 may be unintentionally generated in the second region 920. This kind of anomaly (the nest 100, and the burrs 101, etc.) in the surface of the object 9 may cause the object 9 to be a defective. This requires the anomaly in form as described above to be inspected with high accuracy when the object 9 is inspected with the inspection apparatus 1.

The inspection apparatus 1 is configured such that optical axes K1 to K5 of the corresponding first camera 31 and four second cameras 32 to 35 pass through a point P. The point P is positioned substantially at the center of the upper surface of the protrusion 91. This enables each of the first camera 31 and the four second cameras 32 to 35 to image a region of a substantially identical range (the inspection region of the object 9) centered on the point P.

The controller 8 is means for controlling operation of each unit of the inspection apparatus 1. The controller 8 is composed of a computer having an arithmetic processing unit such as a CPU, a memory such as a RAM, and a storage such as a hard disk drive. The storage stores a program installed for executing inspection of the object 9.

The controller 8 is electrically connected to the first imaging unit 10 and the second imaging unit 20. The program stored in the storage is temporarily read into the memory, and the arithmetic processing unit performs arithmetic processing in accordance with the program. This allows the controller 8 to control operation of the first imaging unit 10 and the second imaging unit 20. The controller 8 also functions as an inspection unit described below.

The controller 8 is connected to a PC 7 provided outside the inspection apparatus 1 to enable bi-directional transmission. Each data obtained by the inspection apparatus 1 is automatically transmitted to the PC 7. When a user of the inspection apparatus 1 inputs operation information from the PC 7, the operation information is transmitted to the controller 8, and then the controller 8 controls each unit in the inspection apparatus 1 according to the operation information.

<1.2 Example of Inspection>

Figure 5:
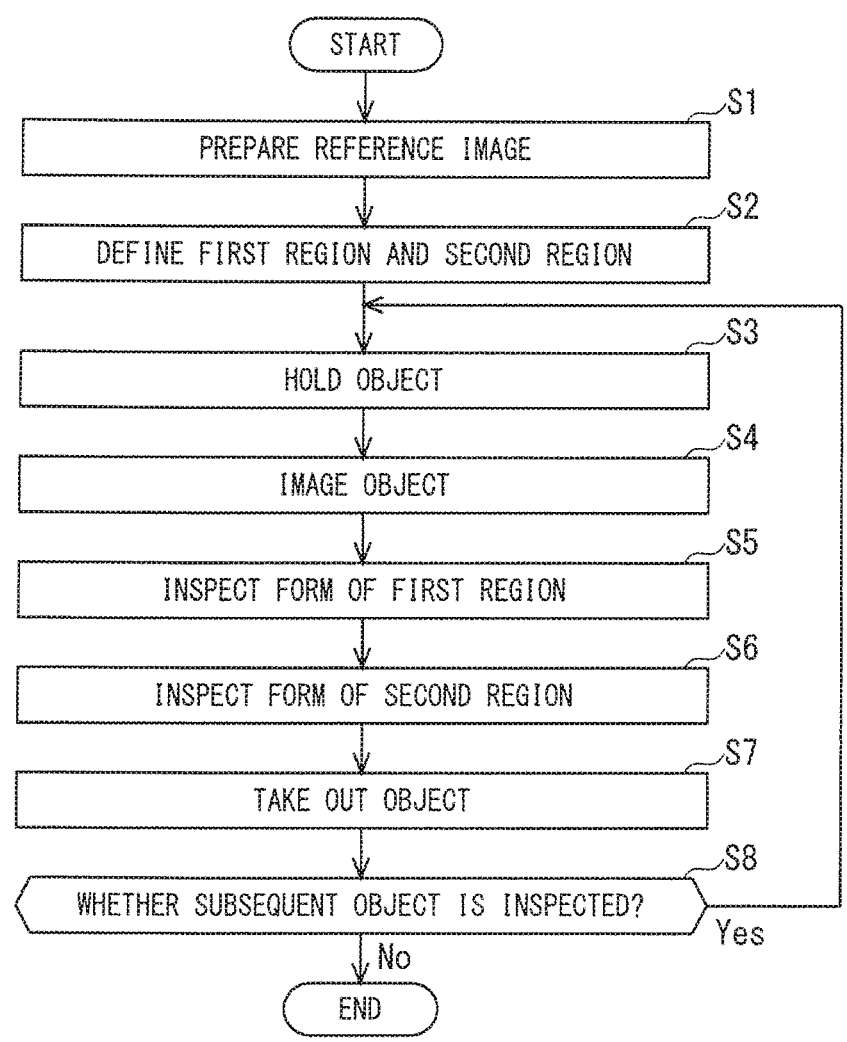
FIG. 5 is a flowchart showing an example of inspection of the object 9.

FIG. 5 is a flowchart showing an example of inspection of the object 9. Hereinafter, with reference to FIG. 5, a flow of sequentially inspecting a plurality of objects 9 obtained by the same manufacturing method will be described.

Figure 6:
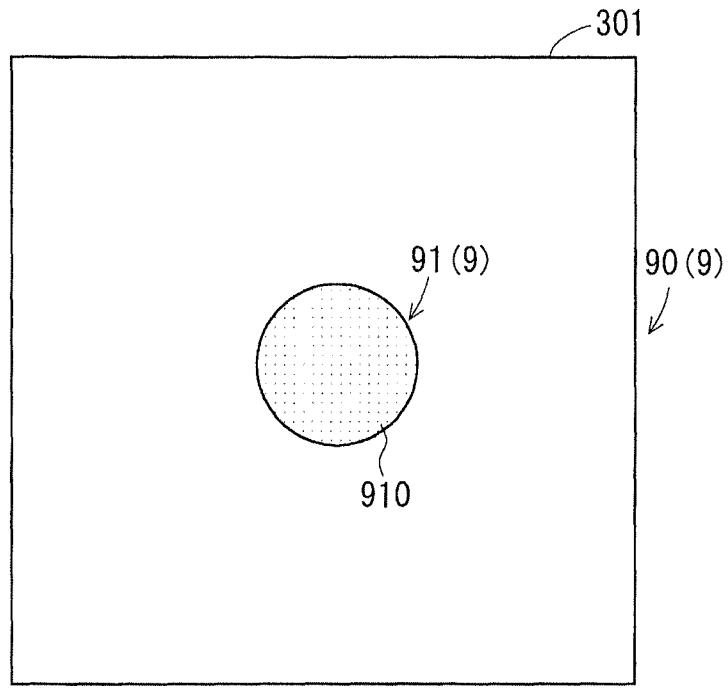
FIG. 6 illustrates an example of a first reference image 301.
Figure 7:
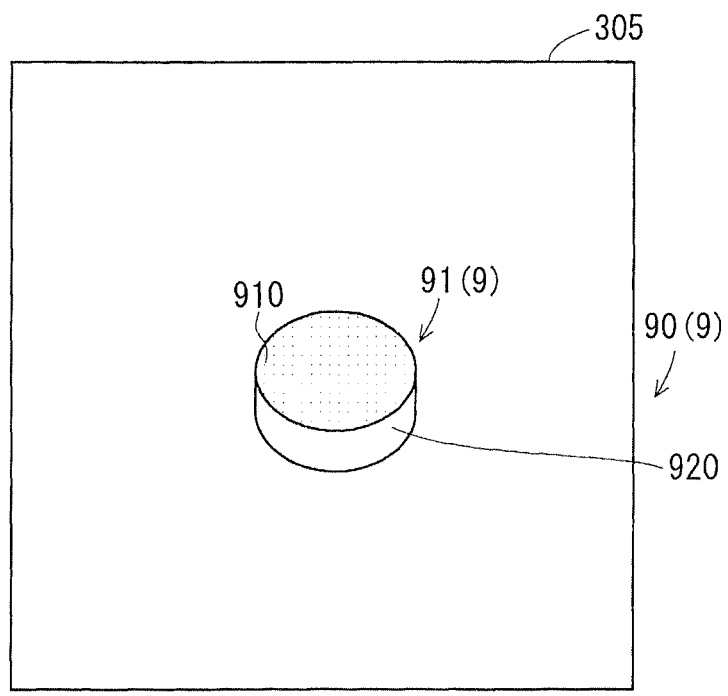
FIG. 7 illustrates an example of a second reference image 305.

First, the storage of the controller 8 stores a first reference image 301 and four second reference images (the drawing shows only a second reference image 305 of the four second reference images) (step S1). FIG. 6 illustrates an example of the first reference image 301. FIG. 7 illustrates an example of the second reference image 305. FIGS. 6 and 7 each include a shaded portion that is the first region 910 to be subjected to the mirror finish treatment. Here, the first reference image 301 corresponds to the first picked-up image 310 (in other words, an image of the object 9 viewed from the first direction), and has no anomaly in the form of the first region 910. The four second reference images correspond to the respective four second picked-up images (in other words, images of the object 9 viewed from the respective four second directions), and have no anomaly in the form of the second region 920.

The first reference image 301 and the four second reference images may be prepared in various manners. For example, a first picked-up image and four second picked-up images preliminarily acquired for one non-defective object 9 (the object 9 with no abnormality in form) may be respectively used as the first reference image 301 and the four second reference images. In addition, an average image of a plurality of first picked-up images preliminarily acquired from the first direction and an average image of a plurality of second picked-up images preliminarily acquired from the respective four second directions, for the plurality of non-defective objects 9, may be respectively used as the first reference image 301 and the four second reference images. Further, images generated on the basis of design data for manufacturing the object 9, which are of a non-defective object 9 assumed to be viewed from the respective first direction and four second directions, may be each used as the corresponding one of the reference image 301 and the four second reference images.

Next, in the first reference image 301 and the four second reference images, the first region 910 to be subjected to the mirror finish treatment and the second region 920 not to be subjected to the mirror finish treatment are set (step S2). The first region 910 and the second region 920 may be set according to an input from an operator using the PC 7. In addition, the first region 910 and the second region 920 may be automatically set by image processing based on the first reference image 301 and the four second reference images. For example, a portion having a relatively high luminance in each of the first reference image 301 and the four second reference images may be automatically set as the first region 910, and a portion having a relatively low luminance therein may be automatically set as the second region 920.

Next, the object 9 is placed on the upper surface of the holder 2 in the posture illustrated in each of FIGS. 1 and 2 (step S3: holding step). The object 9 may be automatically placed on the holder 2 by a dedicated transport mechanism, or may be manually placed by a user of the inspection apparatus 1. In this holding step, the holder 2 holds the object 9 so as to have a positional relationship in which the first region 910 has a normal along the first direction rather than the four second directions. The reason why the object 9 is held in such a manner will be described in detail in <1.3 Effect> described below.

Next, the first imaging unit 10 and the second imaging unit 20 image the object 9 to take a first picked-up image 310 and four second picked-up images, respectively (step S4).

First, the first imaging unit 10 images the inspection region from a first direction with the first camera 31 while the first lighting apparatus 41 irradiates the inspection region with light from the first direction (first imaging step). When the first picked-up image 310 shown in FIG. 3 is taken as described above, imaging by the first camera 31 and light irradiation by the first lighting apparatus 41 are finished.

Subsequently, the second imaging unit 20 images the inspection region from a second direction with the second camera 32 while the second lighting apparatus 42 irradiates the inspection region with light from the second direction (second imaging step). When the second picked-up image from the second direction is taken as described above, imaging by the second camera 32 and light irradiation by the second lighting apparatus 42 are finished.

Subsequently, the second imaging unit 20 images the inspection region from another second direction with the second camera 33 while the second lighting apparatus 43 irradiates the inspection region with light from the other second direction (second imaging step). When the second picked-up image from the other second direction is taken as described above, imaging by the second camera 33 and light irradiation by the second lighting apparatus 43 are finished.

Subsequently, the second imaging unit 20 images the inspection region from yet another second direction with the second camera 34 while the second lighting apparatus 44 irradiates the inspection region with light from yet the other second direction (second imaging step). When the second picked-up image from yet the other second direction is taken as described above, imaging by the second camera 34 and light irradiation by the second lighting apparatus 44 are finished.

Subsequently, the second imaging unit 20 images the inspection region from yet another second direction with the second camera 35 while the second lighting apparatus 45 irradiates the inspection region with light from yet the other second direction (second imaging step). When the second picked-up image (a second picked-up image 350 shown in FIG. 4) from yet the other second direction is taken as described above, imaging by the second camera 35 and light irradiation by the second lighting apparatus 45 are finished.

Next, the controller 8 (inspection unit) inspects the form of the first region 910 on the basis of the first picked-up image 310 taken in the step of first imaging (step S5: inspecting step).

Specifically, after applying various kinds of filter processing (e.g., smoothing filter processing) to the first picked-up image 310 and the first reference image 301, the controller 8 causes both of the images to be moved parallel to each other and turned to perform overall alignment processing of both of the images (also referred to as pre-alignment processing). After this pre-alignment processing, the controller 8 causes both of the images to be moved parallel to each other and turned so as to minimize a difference in pixel value between both of the images only in the first region 910. This allows local positioning processing (also referred to as shaking processing) to be applied to both of the images.

Then, the controller 8 compares the first picked-up image 310 with the first reference image 301 to inspect the form of the first region 910. Specifically, when a degree of coincidence of each pixel in the first region 910 between the first picked-up image 310 and the first reference image 301 is larger than a predetermined threshold value, it is determined that the object 9 imaged has no anomaly in the first region 910 (non-defective product). Meanwhile, when a degree of coincidence of each pixel in the first region 910 between the first picked-up image 310 and the first reference image 301 is smaller than the predetermined threshold value, it is determined that the object 9 imaged has an anomaly in the first region 910 (defective).

Subsequently, the controller 8 (inspection unit) inspects the form of the second region 920 on the basis of the four second picked-up images taken in the second imaging step (step S6: inspecting step).

Specifically, after applying various kinds of filter processing (e.g., smoothing filter processing) to the four second picked-up images and the four second reference images, the controller 8 causes both of the kinds of images to be moved parallel to each other and turned to perform overall alignment processing of both of the kinds of images. After this pre-alignment processing, the controller 8 causes both of the kinds of images to be moved parallel to each other and turned so as to minimize a difference in pixel value between both of the kinds of images only in the second region 920. This allows local positioning processing to be applied to both of the kinds of images.

Then, the controller 8 compares the four second picked-up images with the four second reference images to inspect the form of the second region 920. Specifically, when a degree of coincidence of each pixel in the second region 920 between the four second picked-up image and the four second reference images is larger than a predetermined threshold value, it is determined that the object 9 imaged has no anomaly in the second region 920 (non-defective product). Meanwhile, when a degree of coincidence of each pixel in the second region 920 between the four second picked-up image and the four second reference images is smaller than the predetermined threshold value, it is determined that the object 9 imaged has an anomaly in the first region 920 (defective).

The picked-up images taken in step S4 and the inspection results obtained in steps S5 and S6 are displayed on a display screen of the PC 7 in real time in parallel with each processing on the object 9. More specifically, a part of each picked-up image having no anomaly in form is displayed on the display screen in gray scale, and a part having an anomaly in form (the nest 100, and the burrs 101, etc.) is colored with red color or the like, for example. This enables a user of the inspection apparatus 1 to intuitively grasp a state of the object 9 in real time. These picked-up images and inspection results are stored in the storage of the controller 8, and are used for subsequent various kinds of processing (e.g., processing for analyzing an anomaly in form in detail).

When the inspection of one object 9 is finished as described above, the object 9 is taken out from the inspection apparatus 1 (step S7). When a subsequent object 9 having the same standard as the inspected object 9 is continuously inspected, the processing branches to "Yes" in step S8 and the subsequent object 9 is also subjected to steps S3 to S7. Meanwhile, when the subsequent object 9 is not continuously inspected, the processing branches to "No" in step S8 to finish the inspection processing by the inspection apparatus 1.

<1.3 Effect>

The entire surface of the first region 910 to be subjected to the mirror finish treatment is not necessarily a mirror surface due to influence of the nest 100, or the like, but has a light reflectance higher than that of the second region 920 that is not subjected to the mirror finish treatment. During the period from step S3 to step S6, the holder 2 holds the object 9 so as to have a positional relationship in which the first region 910 has a normal along the first direction rather than the four second directions. Thus, the first camera 31 is more liable to receive regularly reflected light on the first region 910 when the first imaging unit 10 images the inspection region than when the second imaging unit 20 images the inspection region. This enables a state of the mirror surface of the first region 910 (more specifically, whether the first region 910 is appropriately mirror-finished or not, whether the nest 100 is formed in the first region 910 or not, and a size of the nest 100, etc.) to be grasped with high accuracy.

In particular, the present embodiment is configured such that the normal axis of the first region 910 aligns with the axis in the first direction in the vertical axis. Thus, the aspect of the present embodiment enables a state of the mirror surface of the first region 910 to be grasped with higher accuracy than an aspect having slight deviation (e.g., a deviation of 0 to 5 degrees) between the normal axis of the first region and the axis in the first direction, such as a modification described below.

While the first imaging unit 10 images the shape of irregularities of the inspection region of the object 9 vertically from above, the second imaging unit 20 images the shape of the irregularities of the inspection region of the object 9 obliquely from above. Thus, it is more liable to grasp a three-dimensional shape of the entire inspection region when the second imaging unit 20 images the inspection region than when the first imaging unit 10 images the inspection region. This enables the form of the second region 920 (more specifically, whether the burrs 101 are formed or not, and a size of the burrs 101 formed, etc.) to be grasped with higher accuracy.

The present embodiment is configured such that the controller 8 inspects the form of the second region 920 on the basis of the four second picked-up images taken from the respective four second directions. The second region 920 is inspected from the plurality of second directions as described above, so that the form of the second region 920 can be grasped with higher accuracy than when the second region 920 is inspected from a single direction.

The present embodiment is configured such that the controller 8 (inspection unit) inspects the form of the first region 910 by comparing the first picked-up image 310 with the first reference image 301 only in the first region 910. When a comparison object of both of the images is limited only to the first region 910 to be subjected to the mirror finish treatment as described above, a state of the mirror surface of the object 9 can be grasped with higher accuracy.

In addition, the present embodiment is configured such that the controller 8 (inspection unit) inspects the form of the second region 920 by comparing the four second picked-up images with the four second reference images only in the second region 920. When a comparison object of both of the images is limited only to the second region 920 not to be subjected to the mirror finish treatment as described above, influence of light with high intensity, reflected on a mirror surface toward each of the second cameras 32 to 35, can be reduced to enable the form of the entire object 9 to be grasped with higher accuracy.

2 Modification

While the preferred embodiments according to the present invention have been described hereinabove, various modifications of the present invention in addition to those described above may be made without departing from the scope and spirit of the invention.

Figure 8:
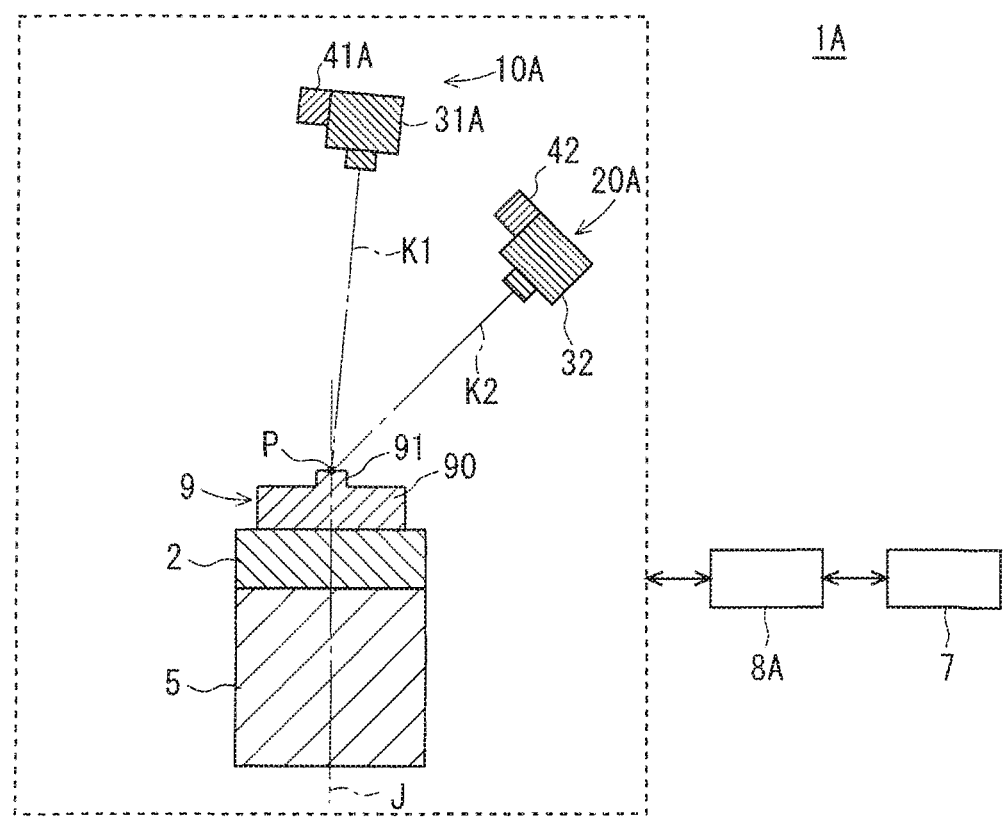
FIG. 8 is a longitudinal end view of an inspection apparatus 1A according to a modification.

FIG. 8 is a longitudinal end view of an inspection apparatus 1A according to a modification. The inspection apparatus 1A includes a first imaging unit 10A and a second imaging unit 20A instead of the first imaging unit 10 and the second imaging unit 20 of the inspection apparatus 1. The inspection apparatus 1A further includes a rotating unit 5.

The first imaging unit 10A includes a first lighting apparatus 41A for irradiating an inspection region of an object 9 with light from a first direction (in the modification, a direction inclined upward at 85 degrees from the horizontal plane) as viewed from the object 9 held by a holder 2, and a first camera 31A for imaging the inspection region of the object 9 from the first direction. When the controller 8 causes illumination by the first lighting apparatus 41A and imaging by the first camera 31A to be simultaneously performed, the inspection region of the object 9 is imaged from the first direction while being irradiated with light from the first direction.

The second imaging unit 20A includes a second lighting apparatus 42 for irradiating the inspection region of the object 9 with light from a second direction (in the present modification, a direction inclined upward at 45 degrees from the horizontal plane) as viewed from the object 9 held by the holder 2, and a second camera 32 for imaging the inspection region of the object 9 from four second directions including the second direction. When the controller 8 causes illumination by the second lighting apparatus 42 and imaging by the second camera 32 to be simultaneously performed, the inspection region of the object 9 is imaged from the second direction while being irradiated with light from the second direction.

As in the present modification, there is available an aspect having deviation between the normal axis (vertical axis) of the first region and the axis in the first direction. Even in the aspect described above, when the holder 2 holds the object 9 so as to have a positional relationship in which a first region has a normal along the first direction rather than the second directions, a state of a mirror surface of the first region can be grasped with high accuracy using the first imaging unit 10A. In particular, when the deviation between the normal axis of the first region and the axis in the first direction is slight (e.g., a difference in inclination of five degrees or less), the first camera 31A can receive more regularly reflected light on the first region to allow the first imaging unit 10A to grasp the state of the mirror surface of the first region with higher accuracy.

The rotating unit 5 can rotate the object 9 held by the holder 2 around its rotation axis J (the vertical axis passing through the point P) while maintaining the positional relationship. This allows the first imaging unit 10A to image the inspection region for each of rotation angles, so that a set of the first camera 31A and the first lighting apparatus 41A can take a plurality of first picked-up images. Likewise, the second imaging unit 20A images the inspection region for each of the rotation angles, so that a set of the second camera 32 and the second lighting apparatus 42 can take a plurality of second picked-up images. For example, the first imaging unit 10A and the second imaging unit 20A each take an image of the inspection region for every four rotation angles by 90 degrees, so that four first picked-up images and four second picked-up images can be taken.

Then, the controller 8A (inspection unit) inspects the form of the first region on the basis of an image having an maximum luminance evaluation value in the first region of the plurality of first picked-up images, and inspects the form of the second region on the basis of all of the plurality of second picked-up images, for example. As described above, a first picked-up image with high luminance is used for inspection of a state of the mirror surface of the first region, and more second picked-up images are used for inspection of the form of the second region, thereby grasping the form of the inspection region with higher accuracy.

The present modification is configured such that first picked-up images can be taken from a plurality of first directions. Thus, even when the normal axis of the first region is slightly displaced from an assumed direction (vertical axis) due to a mistake in placing the object 9 on the holder 2 or a mistake in the mirror finish treatment, a first picked-up image with high luminance can be easily taken from any one of the first directions.

Besides the aspect in which the object 9 is rotated and the first imaging unit 10A and the second imaging unit 20A are fixed around the object 9 like the present modification, there may be used an aspect in which the object 9 is fixed and the first imaging unit and the second imaging unit moves around the object 9.

While the above embodiments are described for the aspect in which the first imaging unit 10 has a set of the first camera 31 and the first lighting apparatus 41, and the second imaging unit 20 has the four sets of each of the second cameras 32 to 35 and the corresponding one of the second lighting apparatuses 42 to 45, the present invention is not limited to this. For example, the first imaging unit may include a plurality of first cameras disposed around its central axis, and a plurality of first lighting apparatuses that irradiates the inspection region with light from near the corresponding plurality of first cameras. In this case, the first imaging unit can take a plurality of first picked-up images by imaging each of portions of the inspection region, irradiated with light from the corresponding one of the first lighting apparatuses, with the corresponding one of the first cameras. The controller 8 (inspection unit) can inspect the form of the first region on the basis of a first image having an maximum luminance evaluation value in the first region of the plurality of first picked-up images.

While the above embodiments are described for the aspect in which the object 9 is a metal component obtained by forming a rough shape by casting and then subjecting it to surface finishing treatment, the present invention is not limited to this. The object 9 may be formed by forging or other methods. However, an anomaly like the nest 100 is likely to occur in the object 9 formed by casting, so that the inspection apparatus according to the present invention can be suitably used for the purpose of inspecting this anomaly.

While the above embodiments are described for the aspect in which one first region 910 exists in the inspection region, a plurality of first regions may exist in the inspection region. When this aspect is configured to have a positional relationship in which at least one first region has a normal along the first direction rather than the second direction, the first imaging unit can grasp a state of the mirror surface of the at least one first region with high accuracy. In addition, when this aspect has a positional relationship in which the plurality of first regions each has a normal along the first direction rather than the second direction, the first imaging unit can grasp a state of the mirror surface of each of the first regions with high accuracy.

While the above embodiments are described for the aspect in which the holder 2 holds the object 9 so as to allow the first region 910 of the object 9 to face vertically upward, the present invention is not limited to this. For example, the holder 2 may be configured to hold the object 9 so as to allow the first region 910 of the object 9 to face horizontally, or the holder 2 may be configured to hold the object 9 so as to allow the first region 910 of the object 9 to face obliquely upward. When these aspects each have a positional relationship in which the first region has a normal along the first direction rather than the second direction, the first imaging unit can grasp a state of the mirror surface of the first region with high accuracy.

While the above embodiments are described for the aspect in which the inspection unit inspects the form of the first region by comparing the first picked-up image with the first reference image, and inspects the form of the second region by comparing the second picked-up image with the second reference image, the present invention is not limited to this. For example, the inspection unit may be configured to inspect the form of each of the first region and the second region by analyzing the first picked-up image and the second picked-up image with reference to design data of the object 9 (data describing the three-dimensional shape of the object 9 and the position of the mirror finish treatment).

While the above embodiments are described for the aspect in which the controller 8 of the inspection apparatus 1 is connected to the PC 7 provided outside the inspection apparatus 1 to enable bi-directional transmission, the present invention is not limited to this. For example, when the inspection apparatus 1 includes an input unit to which operation information is input by a user, the PC 7 may not be provided.

The first imaging unit may have at least one set of the first camera and the first lighting apparatus, and the second imaging unit may have at least one set of the second camera and the second lighting apparatus. In addition, the number of each unit can be appropriately changed.

While the inspection apparatus and the inspection method according to the embodiments and their modifications are described above, these are examples of preferred embodiments of the present invention and do not limit the scope of the present invention. Within the scope of the invention, the present invention allows each embodiment to be freely combined with each other, any component of each embodiment to be modified, or any component of each embodiment to be eliminated.

EXPLANATION OF REFERENCE SIGNS 1, 1A: inspection apparatus
2: holder
5: rotating unit
8, 8A: controller
9: object
10, 10A: first imaging unit
20, 20A: second imaging unit
31, 31A: first camera
41, 41A: first lighting apparatus
32 to 35, 32A: second camera
42 to 45, 42A: second lighting apparatus 90: base portion
91: protrusion
100: nest
101: burrs
910: first region
920: second region

The invention claimed is:

1. An inspection apparatus comprising:
a holder holing an object whose surface includes an inspection region including a first region to be subjected to mirror finish treatment and a second region not to be subjected to the mirror finish treatment;
at least one first camera imaging said inspection region from a first direction while said inspection region is irradiated with light from the first direction when viewed from said object held by said holder;
at least one second camera imaging said inspection region from a second direction while said inspection region is irradiated with light from the second direction when viewed from said object held by said holder;
a controller inspecting a form of said first region based on a first picked-up image taken by said at least one first camera, as well as a form of said second region based on a second picked-up image taken by said at least one second camera; and
a storage storing a first reference image corresponding to said first picked-up image having no anomaly in the form of said first region, as well as a second reference image corresponding to said second picked-up image having no anomaly in the form of said second region,
wherein said holder holds said object so as to have a positional relationship in which said first region has a normal along said first direction rather than said second direction, and
wherein said controller inspects the form of said first region by comparing said first picked-up image with said first reference image, and the form of said second region by comparing said second picked-up image with said second reference image.

2. The inspection apparatus according to claim 1, wherein said controller inspects the form of said first region by comparing said first picked-up image with said first reference image for only the first region.

3. The inspection apparatus according to claim 1, wherein said controller inspects the form of said second region by comparing said second picked-up image with said second reference image for only the second region.

4. The inspection apparatus according to claim 1, further comprising:
a rotating unit that rotates said object held by said holder around a rotation axis while maintaining said positional relationship.

5. The inspection apparatus according to claim 4, wherein
said at least one first camera images said inspection region for each of rotation angles to take a plurality of said first picked-up images, and
said controller inspects the form of said first region based on an image having a maximum luminance evaluation value in said first region of said plurality of said first picked-up images.

6. The inspection apparatus according to claim 4, wherein
said at least one second camera images said inspection region for each of rotation angles to take a plurality of said second picked-up images, and
said controller inspects the form of said second region based on said plurality of said second picked-up images.

7. The inspection apparatus according to claim 1, wherein
the inspection apparatus includes a plurality of first lighting apparatuses and a plurality of first cameras disposed around a central axis,
the plurality of first lighting apparatuses irradiate said inspection region with light from a side of said plurality of first cameras,
said first cameras take a plurality of said first picked-up images by imaging the inspection region, irradiated with light from one or more of the plurality of first lighting apparatuses, and
said controller inspects the form of said first region based on a first picked-up image having a maximum luminance evaluation value in said inspection region of said plurality of said first picked-up images.

8. The inspection apparatus according to claim 1, wherein
the inspection apparatus includes a plurality of second lighting apparatuses and a plurality of second cameras disposed around a central axis,
the plurality of second lighting apparatuses irradiate said inspection region with light from a side of said plurality of second cameras,
said second cameras take a plurality of said second picked-up images by imaging the inspection region, irradiated with light from one or more of the plurality of second lighting apparatuses, and
said controller inspects the form of said second region based on said plurality of said second picked-up images.

9. An inspection method comprising:
a holding step of holding an object whose surface includes an inspection region including a first region to be subjected to mirror finish treatment and a second region not to be subjected to the mirror finish treatment;
a first imaging step of imaging said inspection region from a first direction while said inspection region is irradiated with light from the first direction when viewed from said object held in said holding step;
a second imaging step of imaging said inspection region from a second direction while said inspection region is irradiated with light from the second direction when viewed from said object held in said holding step; and
an inspecting step of inspecting a form of said first region based on a first picked-up image taken in said first imaging step, as well as a form of said second region based on a second picked-up image taken in said second imaging step, wherein
in said holding step, said object is held so as to have a positional relationship in which said first region has a normal along said first direction rather than said second direction,
a storage stores a first reference image corresponding to said first picked-up image having no anomaly in the form of said first region, as well as a second reference image corresponding to said second picked-up image having no anomaly in the form of said second region, and
in said inspection step, the form of said first region is inspected by comparing said first picked-up image with said first reference image, and the form of said second region by comparing said second picked-up image with said second reference image.

10. The inspection apparatus according to claim 1, wherein an angle between a normal of said first region and said first direction is five degrees or less.

11. The inspection apparatus according to claim 10, wherein the normal of said first region aligns with said first direction.

12. The inspection apparatus according to claim 1, wherein said at least one first camera is provided integrally with a at least one first lighting apparatus and said at least one second camera is provided integrally with a at least one second irradiating apparatus.

13. The inspection apparatus according to claim 1, wherein said at least one first camera is configured to image in a state that an optical axis of said at least one first camera passes through a predetermined point on said inspection region and said at least one second camera is configured to image in a state that an optical axis of said at least one second camera passes through said predetermined point on said inspection region.

* * * * *